May 7, 1963 C. E. JOHNSON ETAL 3,088,542
PIVOTALLY CONNECTED AND SECTIONALIZED FIRE CHUTE ARRANGEMENT
Original Filed Oct. 5, 1959 4 Sheets-Sheet 1
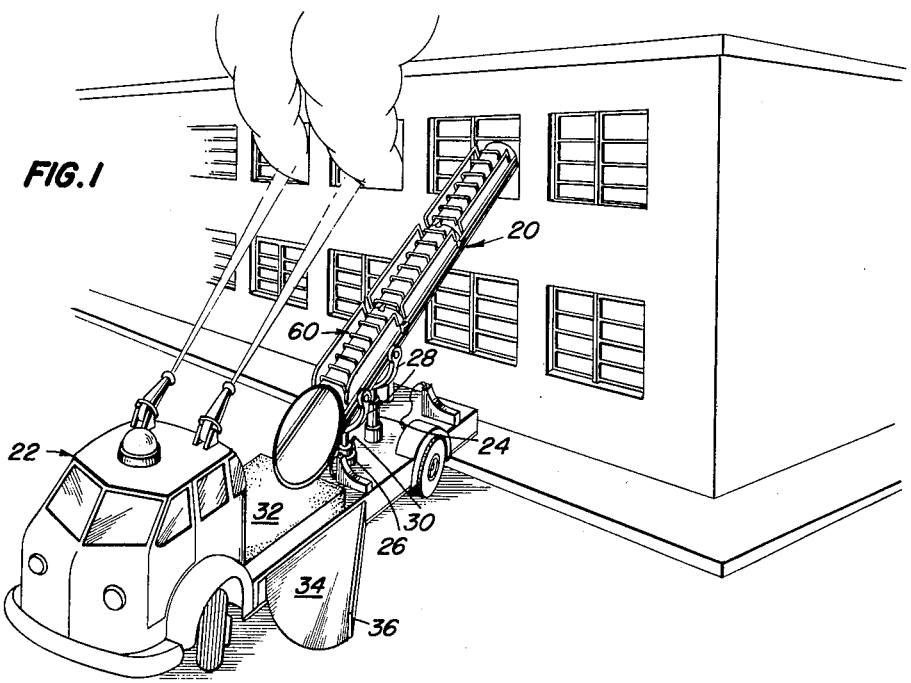
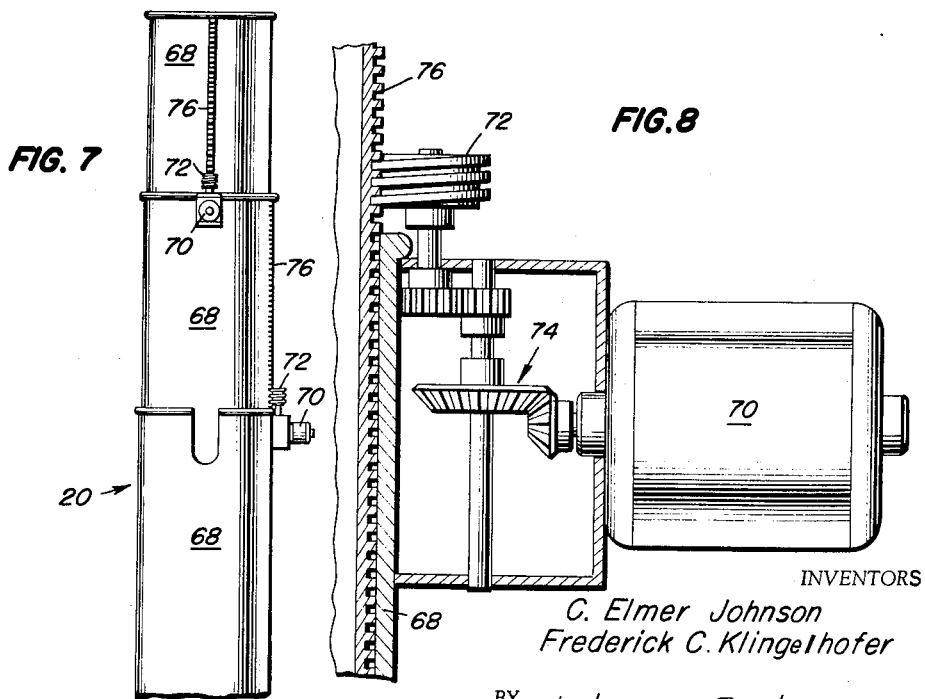
INVENTORS
C. Elmer Johnson
Frederick C. Klingelhofer
BY Walter G. Finch
ATTORNEY May 7, 1963 C. E. JOHNSON ETAL 3,088,542
PIVOTALLY CONNECTED AND SECTIONALIZED FIRE CHUTE ARRANGEMENT
Original Filed Oct. 5, 1959 4 Sheets-Sheet 2
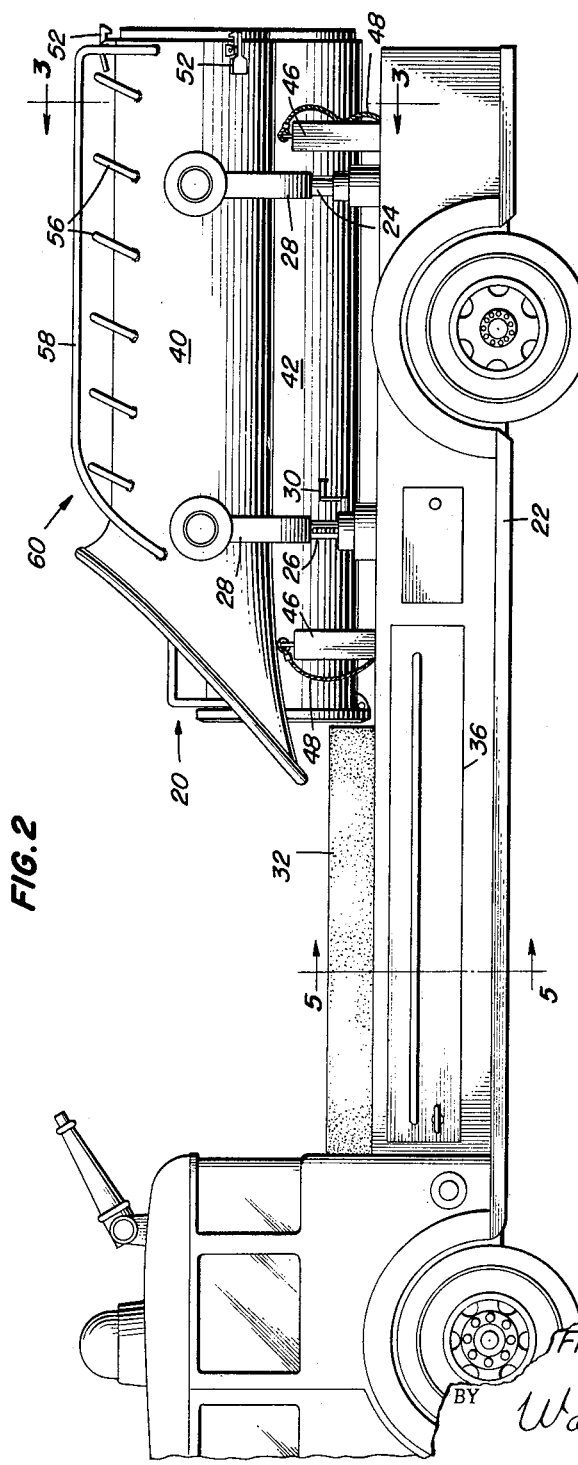
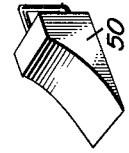
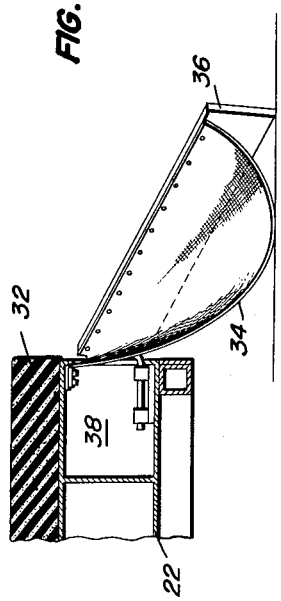
INVENTORS
C. Elmer Johnson
Frederick C. Klingelhofer
BY Walter G. Finch
ATTORNEY

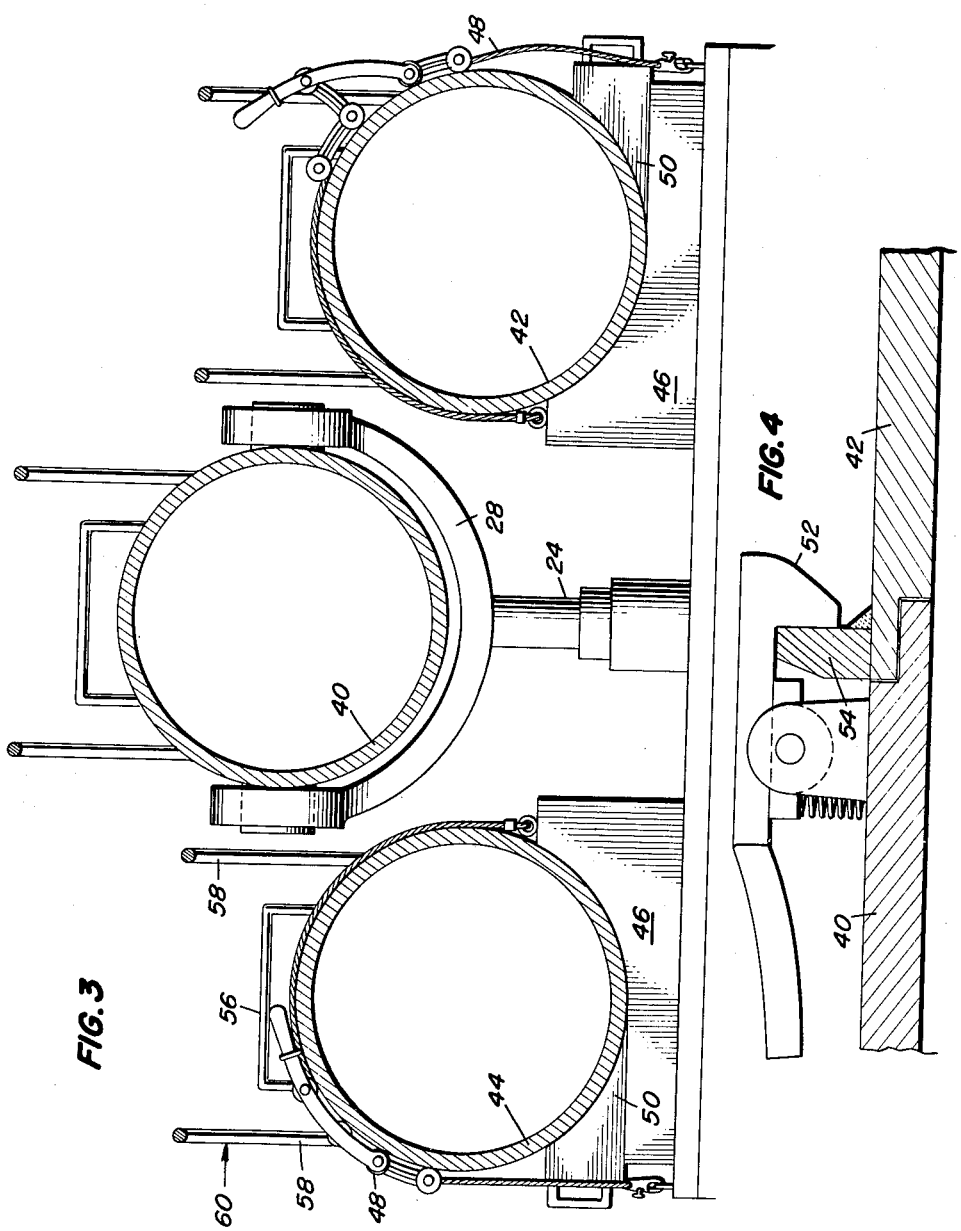

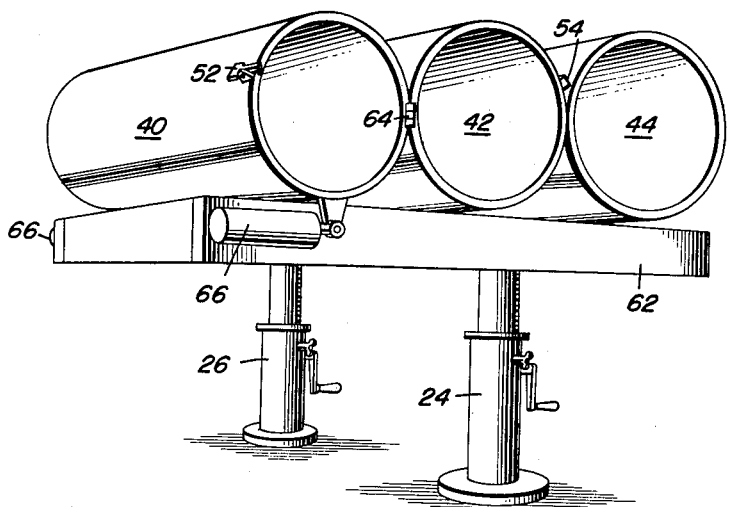
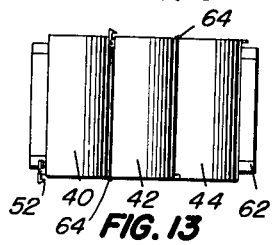
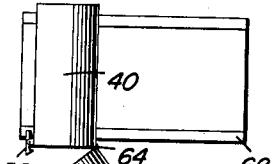
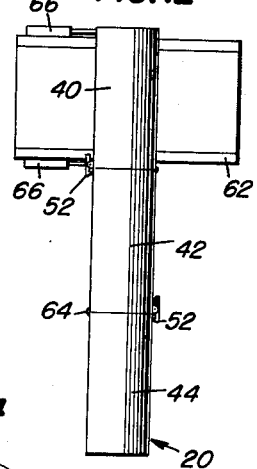
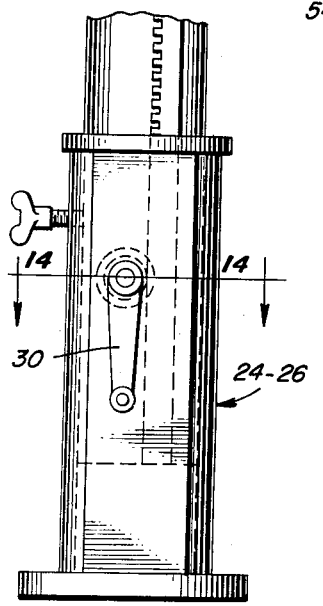
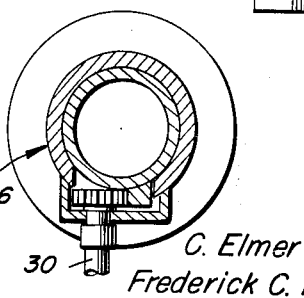

United States Patent Office 3,088,542
Patented May 7, 1963

3,088,542
PIVOTALLY CONNECTED AND SECTIONALIZED
FIRE CHUTE ARRANGEMENT
Clas Elmer Johnson and Frederick C. Klingelhofer, both of 8622 Quentin Ave., Baltimore, Md.
Original application Oct. 5, 1959, Ser. No. 844,574, now Patent No. 3,027,966, dated Apr. 3, 1962. Divided and this application Apr. 7, 1960, Ser. No. 20,619
2 Claims. (Cl. 182—48)

This invention relates generally to fire escape apparatus, and, more particularly, it pertains to a mobile, extendable chute for rescuing trapped persons or small animals. This patent application is a division of U.S. Letters Patent No. 3,027,966, issued April 3, 1962, to applicants for "Fire Chute Arrangement."

Many people are burned to death every year because of their reluctance to jump into a rescue net or descend a fire ladder from upper windows or roofs of buildings. Often, when a ladder is raised to the trapped person, the latter is unable to use it because of enveloping flames from lower windows.

It is, therefore, an object of this invention to provide a combined rescue chute and ladder for rescuing persons from burning buildings.

Another object of this invention is to provide an articulated rescue chute tube which is readily stowed for portability.

Still another object of this invention is to provide a rigid segmented tube arrangement for use in fire escape apparatus.

And another object of this invention is to provide a telescopic rescue chute with a motor-driven extension mechanism.

And yet another object of this invention is to provide a stowage arrangement for securing rescue chute segments in a vehicle for ready service.

These and other objects and attendant advantages of the invention will become more readily apparent and understood from the accompanying specification and drawings in which:

FIG. 1 is a perspective view of a mobile fire rescue chute and ladder combination in raised position adjacent to a building for service;

FIG. 2 is a side elevation of the fire rescue chute and ladder in stowed condition, with one tube segment being removed for clarity;

FIG. 3 is a view taken in the direction of the arrows 3—3 of FIG. 2;

FIG. 4 is a detail view, partly in section, of a joint securing clasp;

FIG. 5 is a cross-section taken along line 5—5 of FIG. 2 illustrating one of the opened secondary chutes;

FIG. 6 is a perspective drawing of a stowage chuck;

FIG. 7 is a side view of an alternate segmented tube arrangement showing motor-driven telescopic extension provisions therefor;

FIG. 8 is a detail drawing, partly in section, of a motor drive for telescoping tubes;

FIG. 9 is a perspective drawing showing articulated tubes in stowed position on an elevating stage or platform;

FIGS. 10, 11, and 12 are illustrative step diagrams, respectively, of the stowed, partly articulated, and final joining of tube segments of FIG. 9;

FIG. 13 is a detail drawing of an elevating hoist; and

FIG. 14 is a cross-section taken in the direction of the arrows 14—14 of FIG. 13.

Referring now to FIG. 1 of the drawing, there is shown generally therein a safety slide or chute 20. Chute 20 is constructed of lightweight metal or composition tubing having a smooth polished interior.

A pair of jacks 24 and 26, shown in detail in FIGS. 13 and 14, are secured in spaced relationship upon the bed of a fire truck vehicle 22. The jacks 24 and 26 are pivotally attached to the chute 20 by means of stirrups 28. By means of jack handles 30, the jacks 24 and 26 may be individually raised or lowered. If the rearmost jack 24 is extended farther than the forward jack 26, the chute 20 is elevated at its end remote from the vehicle 22.

Aided by movement of the vehicle 22, the chute 20 can be maneuvered to upper windows of a burning building, as shown. The person being rescued slides down within the chute 20 to land upon an inflated air mat or resilient cushion 32. From there, he eases himself to the ground level by means of a secondary chute or guide 34 of heavy fabric attached to the side of the vehicle 22.

A hinged plate 36, shown in FIG. 1, pivoting at one end from the body of the vehicle 22 supports the outer edge of the fabric of guide 34 and may also serve as a door for a stowage compartment 38, as shown in FIGS. 2 and 5.

For stowage and transportation, the chute 20 is divided into a pluraltiy of segments 40, 42, and 44, as best shown in FIG. 3. The terminal section or segment 40 is retained in its stirrup 28, while the other segments 42 and 44 are disposed to either side in cradles 46 and held in place by quick-release toggle clamps and cables 48.

To provide ready sideward removable of the segments 42 and 44, the cradles 46 are cut away at the side and removable chucks 50, shown in detail in FIG. 6, are used.

A plurality of spring clasps 52, shown in FIG. 4 engaging with an end ring or dog 54, join the mortised and tenoned ends of the tube segments 40, 42, and 42, 44 into a rigid assembly capable of supporting a ladder 60.

Rings 56 and hand rails 58 to make up the ladder 60 may be welded or riveted directly to the tubing of the tube segments 40, 42, and 44, as shown in FIGS. 1, 2 and 3 and the orientation of the chute 20 simultaneously positions the ladder 60 for most advantageous rescue work.

FIG. 9 illustrates an alternative arrangement for articulating the tube segments 40, 42, and 44. A platform 62 is supported upon the jacks 24 and 26. The terminal tube segment 40 is stowed at one side of the platform 62, as shown. The next tube segment 42 is joined to the terminal tube segment 40 by means of a hinge 64. Another hinge 64 similarly joins the other end of tube segment 42 to tube segment 44, as shown best in FIG. 10.

The steps of joining the tube segments 40, 42, and 44, for service are shown in FIGS. 11 and 12 in consecutive order. The tube segments 42 and 44 are manually removed from the platform 62, and unfolded and swung around until the clasps 52 engage wtih their dogs 54, thus placing all segments in line, rigidly secured by the previously mentioned mortise and tenon joints therebetween.

As shown in FIG. 12, the entire line of segments 40, 42, and 44 making up the safety slide or chute 20 is then pushed bodily rightward by a pair of hydraulic cylinders 66 to the center of the platform 62 which then may be raised and canted to elevate the chute 20 for rescue service as related.

If the ladder feature is not required, a telescopic arrangement for stowing the tube segments 40, 42, and 44 may be employed. This alternate arrangement, illustrated in FIGS. 7 and 8, has the added feature of length extension of the chute 20. A plurality of chute tube segments 68 are arranged to telescope within each other in sliding fit.

A motor 70 is attached to each segment 68 and arranged to drive a worm gear 72 through a reduction gearing 74. A rack rail 76 on an adjacent segment 68 engages this worm gear 72 to extend the tube segments 68 from each other as the motor 70 rotates. No clasp or other lock is required because the worm and rack arrangement is self-locking at any degree of extension. The various parts of the apparatus are preferably made of lightweight metal, such as aluminum.

Obviously, many other modifications and variations of the present invention are possible in the light of the above teachings. It is, therefore, to be understood that within the scope of the appended claims, the invention may be practiced otherwise than as specifically described.

What is claimed is:

1. A pair of spaced independently operated elevating jacks arranged to be mounted on an automotive type vehicle, a substantially elongated shaped base mounted on the top of said pair of spaced jacks and arranged to be canted by said spaced elevating jacks, a tubular chute positioned on top of said base substantially parallel thereto and formed of a plurality of pivotally connected sections arranged to be mounted end to end to form a continuous tube, and means on said base for moving said continuous tubular chute laterally on said base.

2. Apparatus as set forth in claim 1, provided with means for positively locking adjacent pivotally connected sections together as an integral unit.

References Cited in the file of this patent

UNITED STATES PATENTS

| | | |
|---|---|---|
| 139,416 | O'Brien | May 27, 1873 |
| 346,540 | Friborg | Aug. 3, 1886 |
| 857,784 | Bisset | June 25, 1907 |
| 2,656,999 | Ullberg | Oct. 27, 1953 |
| 2,829,814 | Warner | Apr. 8, 1958 |